Feb. 23, 1954 L. O. HUHN 2,670,105
DISPENSER FOR COFFEE AND LIKE MATERIAL
Filed Dec. 6, 1951 2 Sheets-Sheet 1
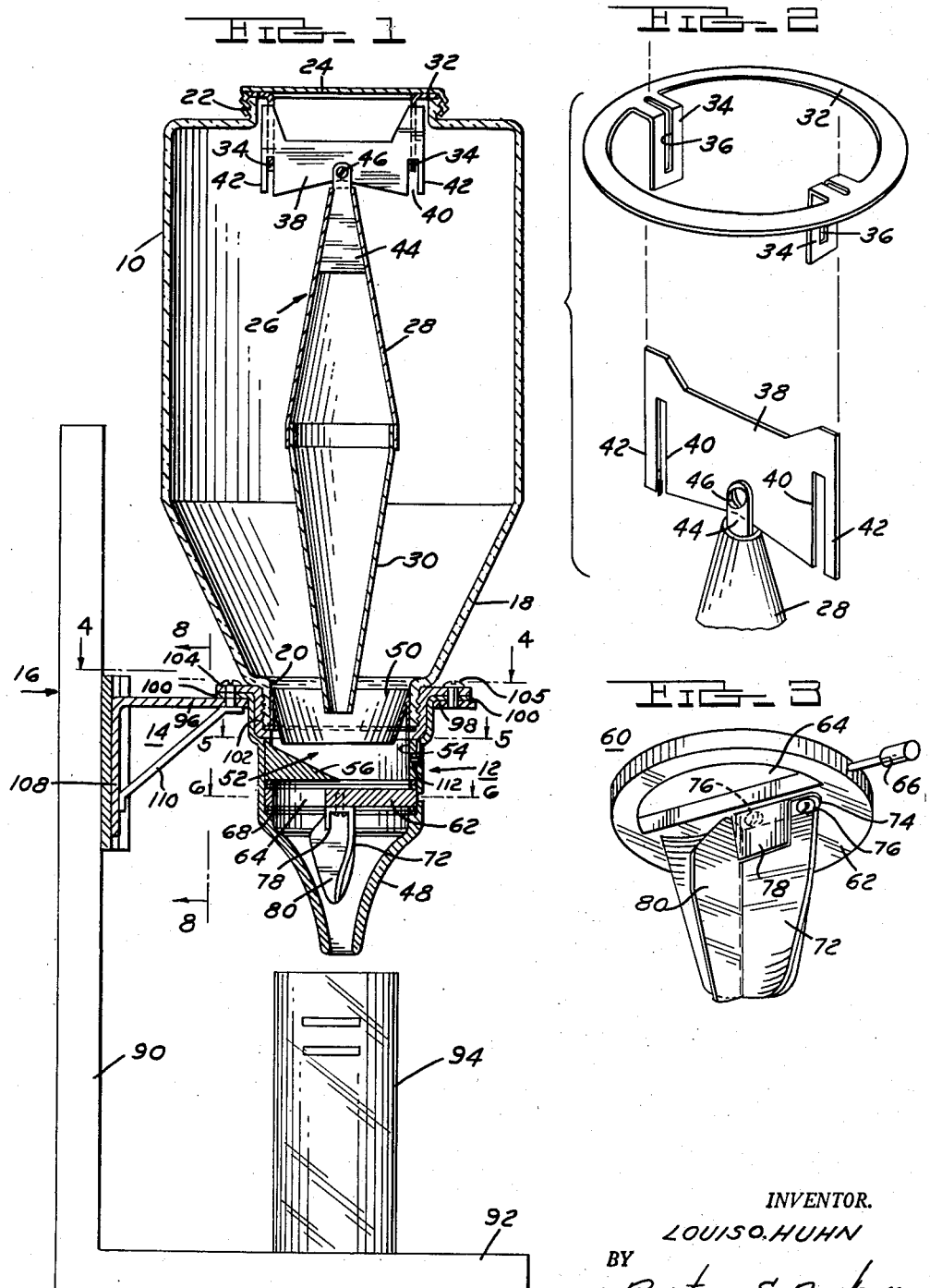
INVENTOR.
LOUIS O. HUHN
BY
Burton & Parker
ATTORNEYS Feb. 23, 1954
L. O. HUHN
2,670,105
DISPENSER FOR COFFEE AND LIKE MATERIAL
Filed Dec. 6, 1951
2 Sheets-Sheet 2
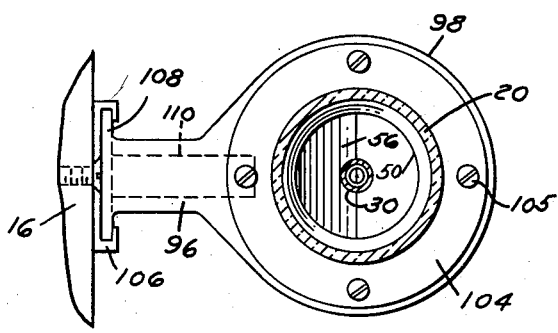
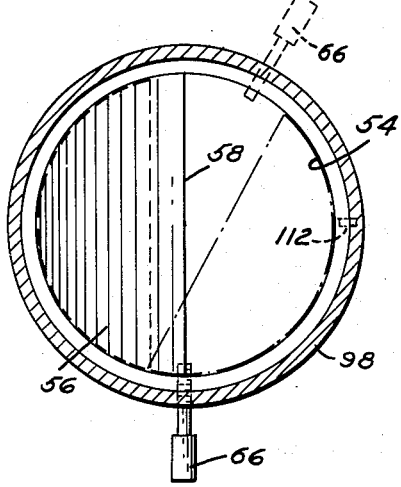
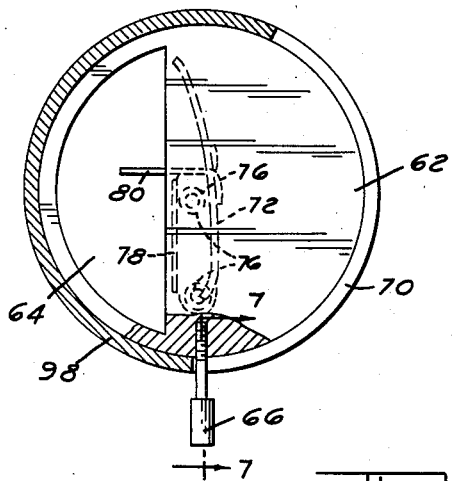
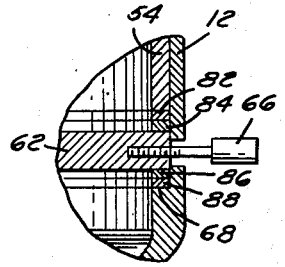
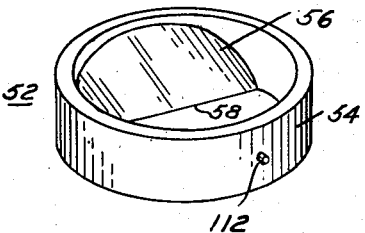
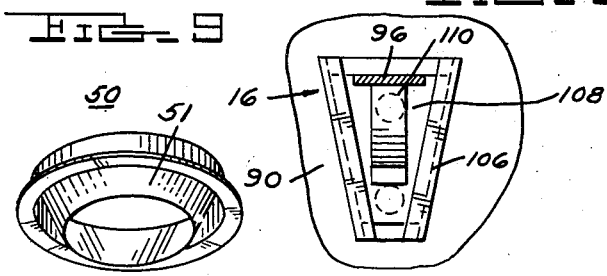
INVENTOR.
LOUIS O. HUHN
BY
Burton & Parker
ATTORNEYS Patented Feb. 23, 1954

2,670,105

UNITED STATES PATENT OFFICE 2,670,105

DISPENSER FOR COFFEE AND LIKE MATERIAL

Louis O. Huhn, Detroit, Mich.

Application December 6, 1951, Serial No. 260,190

3 Claims. (Cl. 222—251)

1

This invention relates to dispensing devices employed for dispensing granular or powdered materials and particularly to an improved device for dispensing coffee and like materials.

An important object of this invention is to provide an improved device for dispensing coffee and like materials which provides a free steady flow of the coffee from a container and regardless of the level of the coffee within the container. Another important object of the invention is to provide an improved device of this character which includes novel means for preventing the hollowing out of the content of the container as the content is gradually decreased during the use of the device and which cooperates in a novel manner with valving means for controlling the amount of coffee or like material discharged from the container. A further important object of the invention is to provide a device of this character having improved discharge means at the lower end of the container which is smoothly operable over long periods of use and which provides a freely flowing stream of coffee or other content material from the container.

In carrying out the objects of the invention, the dispensing device includes a vertically arranged container having a discharge opening in the lower end thereof and optionally having an inlet opening in the upper end of the container depending upon the form of container used. Secured to the lower end of the container and in surrounding relation to the discharge opening thereof is a hollow body which is interiorly arranged in a novel manner for the flow of content material therethrough and which terminates in a tapering discharge spout. Mounted within the hollow body is a valve assembly which is constructed in a novel manner for providing a steady freely flowing stream of material when the valve is turned to open position. Mounted within the container, and preferably suspended from its upper end, is novel means for preventing the caving in or hollowing out of content material as the latter is progressively dispensed from the container. This means is in the form of an elongated member approximating the axial dimension of the container and designed with converging surfaces which enter the discharge opening and cooperate with the operating members within the hollow body for providing the free flow of content material out of the device.

Various other objects, advantages and meritorious features of the invention will become more fully apparent from the following specification,

2 appended claims and accompanying drawings wherein:

Fig. 1 is a vertical sectional view through a dispensing device embodying the features of this invention and showing the construction and relation of the interior parts thereof, Fig. 2 is an enlarged exploded view in perspective showing the manner of detachably suspending the member for preventing the hollowing out of the content material in the container, Fig. 3 is an enlarged perspective view showing the underside of the valve member, Fig. 4 is an enlarged horizontal cross-sectional view taken along line 4—4 of Fig. 1 and showing the manner of mounting the device on a vertical support or wall, Fig. 5 is an enlarged horizontal sectional view taken along line 5—5 of Fig. 1 and showing two positions of the valve in full and dotted lines, Fig. 6 is an enlarged horizontal cross-sectional view taken along line 6—6 of Fig. 1, Fig. 7 is a fragmentary sectional view taken along line 7—7 of Fig. 6, Fig. 8 is a fragmentary vertical sectional view taken along line 8—8 of Fig. 1 and showing the bracket mounting for the device, Fig. 9 is a perspective view of a supporting collar for the container partly broken away in section, and Fig. 10 is a perspective view of a deflector member in the valve assembly.

The illustrated embodiment of the invention comprises, in general, a casing or container 10 for storing coffee and like material, a valving device 12 on the lower end of the container from which controlled amounts of coffee or other content material are dispensed, and a bracket 14 for supporting the container from a wall or an upright standard 16 as shown herein. The container 10 may be of any suitable type for the purpose and formed of metal or glass. It is herein shown as formed of a relatively large glass jar and provided with a funnel shaped lower portion 18 terminating in an externally threaded neck 20 forming a downwardly opening discharge outlet for the container. The upper end of the container 10 is likewise provided with an externally threaded neck 22 forming an inlet opening for the container. A cap 24 having threads is removably screwed to the upper neck 22 to close the same. Although intended primarily for dispensing coffee, similar types of material, such as sugar, may be stored in the container.

An important feature of the invention is the provision of means within the container 10 for preventing the hollowing out of the content material as the level thereof in the container progressively lowers during the use of the device. In the past, when coffee and like material was dispensed from containers having centrally located discharge outlets, the mass of the coffee in the center of the container flowed out first producing a caved in or hollow formation in the content material which impeded the free flow of the material and left a residue of the material along the side walls of the container. The means herein described for preventing such hollowing out action comprises an elongated member generally indicated at 26 and preferably having a length as shown in Fig. 1 approximating the axial dimension of the container 10. The member 26 is herein shown as having two reversely related conical sections 28 and 30 and convergingly tapers from a maximum cross sectional area at approximately its mid point to a minimum cross section at each of its opposite ends. The member 26 may be formed out of one piece but is herein illustrated as composed of two separate hollow conical elements joined at their bases by the telescoping interfitting engagement shown in Fig. 1. The apex ends of each element may be left opened. The two elements or sections of the member 26 may be formed of light-weight metallic material, such as aluminum, and be imperforate as shown throughout their respective conical surfaces or perforated in the form of a screen.

The cone member 26 is supported inside of the container 10 on the vertical axis thereof and such that the apex end of the lower section 30 centrally enters the discharge outlet and into the area circumscribed by the valving device 12 as hereinafter described. This is preferably accomplished as shown in Figs. 1 and 2 by suspending the upper end of the cone member 26 from the upper end of the container by means which will permit the member to be removed for cleaning. Fitting the rim or lip of the neck 22 of the container is a ring 32 of thin metallic material. Projecting first inwardly and then downwardly from diametrically opposite sides of the ring 32 are two similar slotted elements or tongues 34—34. The slot 36 of each tongue extends substantially the full length thereof and through the right angle bend as best shown in Fig. 2. Bridging the distance between the tongues is a vertically disposed plate-like member 38 shaped with two similar downwardly opening slots 38—38 which extend close to the opposite side margins of the member and form hook elements 40—40. In assembling the plate member 38 onto the ring 32, it is dropped vertically through the opening in the ring with its hook elements 42—42 interengaging with the slots 36 of the tongues in the manner shown in Fig. 1.

Pivotally connected to the center of the midsection of the plate member 38 is a depending arm 44 formed of flat strip material and which as shown in Figs. 1 and 2 enters the apex end of the upper conical section 28 of the cone member. The arm is flared outwardly from its upper connected end to its lower end and provided with diverging side edges conforming substantially to the conical formation of the conical section which it enters as shown in Fig. 1. The arm 44 is connected to the plate member 38 by a fastener in the form of a screw 46 and depending upon the tightness of the screw may be either rigidly secured to the plate member or permitted a limited swinging movement on the axis of the screw.

The cone member assembly is passed through the inlet opening formed by the neck 22 and suspended in the container by the bearing engagement of the ring 32 on the rim of the neck. The assembly is locked in position by threading the cap 24 to the neck. In this manner the core member 26 is suspended centrally within the container 10 and with its lower end projecting downwardly into the discharge outlet and into the valving receptable 12 secured to the bottom side thereof.

For metallic containers, the cone member 26 may be suspended by a mounting generally like that shown in Fig. 2 with the ring 32 or equivalent member riveted, soldered or otherwise secured to the under side of the top of the container.

Another important feature of the invention is the construction and operation of the valving mechanism at the discharge end of the container. The valve is housed within the hollow body or receptacle 12 receiving at its upper end the neck 20 of the container 10 and provided at its lower end with a tapering funnel or discharge spout 48. Mounted within the upper end of the body 12 is a ring shaped member 50 preferably constructed in the manner shown in Fig. 9. Member 50 hugs the inner surface of the neck 20 and is provided with a downwardly and inwardly inclined circular wall 51 which encircles the lower or apex end of the cone section 30. Below the ring member 50 is a deflector 52 preferably constructed in the manner shown in Fig. 10 and including a circular band or ring portion 54 and a semi-circular inclined portion 56. The latter inclines downwardly and inwardly from its outer margin to a straight edge 58 extending diametrically across the hollow body 12. Below the deflector 52 is a valve generally indicated at 60 and preferably constructed as shown in Fig. 3, the valve comprising a circular plate member 62 cut away internally to provide a half-moon shaped aperture 64. The valve member 62 is rotatably mounted in the hollow body and is provided with a lateral projecting handle 66 for this purpose. The valve member is rotatably supported upon a circular shoulder 68 formed interiorly of the body 12 in the manner shown in Figs. 1 and 7. One side of the body 12 is provided with an arcuate slot 70 extending partially therearound as shown in Fig. 6 and through which the handle 66 projects to the outside of the body.

Suspended under the valve member 62 and secured thereto for joint rotation are vane-like elements projecting downwardly into the spout 48 as shown in Fig. 1. One vane element is indicated at 72 and extends substantially parallel to the straight edge of the aperture 64 and in slight spaced relation thereto as shown in Fig. 3. The vane 72 may be formed of sheet metal stock and provided at its upper end with a lateral dimension approximately equal to or slightly less than the straight edge of the aperture 64. The upper end of the vane 72 is provided with an inturned flange 74 which serves as a means for securing the vane to the underside of the valve member. For this purpose a pair of screws 76 are provided which secure the flange to the valve member in the manner shown in Figs. 3 and 6.

The vane 72 is provided with an additional subsidiary vane 78 preferably formed out of the flange 74 and depending downwardly from the valve member in closer proximity to the straight edge of the aperture 64 than the main vane element 72. A cross vane 80 is secured to the aperture side of the vane in substantially perpendicular relation to the vane element 72. The two vane elements 72 and 80 have substantially the same vertical dimensions as shown in Fig. 3 but the vane 80 has a width approximately half that of the vane 72 and projects from the aperture side thereof. The three vane elements 72, 78 and 80 associated with the valve member function to prevent the spout 48 from filling up with content material such as coffee during the operation of the device. These vane elements rotate jointly with the valve member and cooperate to direct the flow of content material straight down the aperture 74 and out of the spout 48. The larger vane 72 also serves to provide an air pocket in the spout 48 on the side thereof opposite to the aperture 64 and in this manner prevents a building up of the content material in the spout 48 and the resulting impairment of the free flow of the material out of the spout.

It is evident from the description of the valve mechanism thus far described that when the valve member 62 is rotated to bring its aperture 64 in under the inclined portion 56 of the deflector that the flow of material from the container to the spout will be cut off and that as the valve member is rotated from this closed position approximately 180 degrees such as to the position shown in dotted outline in Fig. 5 the aperture 64 will be brought in alignment with the aperture 57 of the deflector thereby permitting content material to flow downwardly through the discharge outlet of the container, through the valve body 12 and out of the spout 48. The valve member 62 may be swung to any position short of fully opened position to vary the volume of the content material flowing out of the device.

Another important feature of the invention is the provision made for mounting the valve member 62 and its associated parts for rotation in the body 12. This means comprises two sets of pairs of washer members composed of paper rather than metal as has been the practice heretofore. One set of washers, such as that indicated at 82 and 84 is positioned immediately above the valve member 62 as shown in Fig. 7. The other set indicated by the reference characters 86 and 88 are located immediately below the valve member 62. The washer 82 in the upper set serves as a bearing support for the ring 54 of the deflector 52. The washer 88 of the lower set more remote from the valve member 62 bears upon the circular shoulder 68 of the body 12. All four washers, 82, 84, 86 and 88, are cut out from flat paper stock, such as cardboard, and formed into rings whose outer diameters are substantially equal to the inner diameter of the body 12 and the exterior diameter of the valve member 62. Preferably, one side of each cardboard washer is coated with paraffin or a substance having the functional characteristics of paraffin. The opposite side of each washer should be left uncoated but smooth and flat. The paraffin coated sides of the washers bear against the metal parts and tend to adhere thereto but the opposite uncoated sides contact the next adjacent washer and freely slide over one another. It has been found that such paraffin coated paper washers are highly satisfactory for the purpose and enable the valve member 62 to be turned with a minimum amount of resistance. Moreover, being formed of paper, they are under slight compression preventing the introduction of any of the particles of the content material therebetween and between any of the parts of the valve mechanism against which they bear.

In the case of metallic bearing surfaces heretofore employed, any irregularity or deformity in the washers permitted the small grains, dust or particles of the content material to enter between the washers or the adjacent surfaces of the parts of the valving mechanism causing the washers to resist turning movement of the valve member. Being formed of paper, the washers of the present invention are capable of being economically manufactured and replaced at low cost. Tests have proven that paper washers for this purpose will provide many thousands of turning movements of the valve member with very little wear and therefore are highly satisfactory for the purpose intended.

The bracket 14 is capable of supporting the container 10 and the associated parts of the device in vertically spaced relation to a base upon which a measuring cup or glass is placed. In Fig. 1 the bracket is shown as connected to an upright member 90 of an L-shaped standard having a base leg portion 92 upon which a measuring glass 94 may be supported. However, the bracket 14 may be secured directly to a wall alongside of which a table is provided for the measuring receptacle.

The bracket 14 comprises a lateral extension 96 terminating in an annularly shaped section 98, the inner diameter of which is greater than the neck 20 of the container. The upper end of the body 12 is provided with a circular, laterally extending flange 100 which as shown in Fig. 1 bears upon the upper surface of the annular section 98. The glass type of containers such as illustrated in Fig. 1 bears upon the upper surface of the annular section 98. For glass type of containers such as illustrated in Fig. 1, there is preferably provided a collar 102 which is internally threaded for receiving the threads of the neck 20. The collar 102 is so dimensionally proportioned as to be received between the upper end of the body 12 and the neck 20. The collar is provided with a radial flange 104 extending completely therearound as shown in Fig. 4 and which bears upon the flange 100 of the body. The two flanges 100 and 104 are secured to the annular section 98 of the bracket by means of screws 105 circularly spaced therearound in the manner shown in Fig. 4.

The outer end of the bracket may be of any suitable formation for securement to the standard 16 or a wall which ever is elected for support. For this purpose the bracket 14 includes a generally V-shaped stationary guide 106 which is fastened to the standard 16 or other support. The diverging sides of the guide 106 are provided with undercut grooves for receiving a vertical depending plate section 108 of the bracket. The latter may form an integral part of the extension 96 and be bent at right angles thereto as shown in Fig. 1. The side edges of the vertical section or plate 108 converge toward one another in the downward direction and at an inclination similar to that of the grooves in the side members of the guide 106. In this manner, the bracket 14 may be dropped into the guide and wedged in the latter. An auxiliary inclined bracing member 110 may be provided for reinforcing the bracket 14 and bridge the corner formed by the two right angularly extending sections 96 and 108 of the bracket assembly.

What I claim is:

1. In a dispensing device for coffee and like material, a vertically arranged container open at its lower end for the discharge of content material therefrom, a hollow body secured to the lower end of the container in surrounding relation to the discharge opening thereof in order to receive the content material therefrom, said body having its lower end portion terminating in a discharge spout, an inclined member mounted in the body intermediate the opposite ends thereof and arranged to direct the content material entering the body toward one side thereof, a valve mounted in the body immediately below the inclined member and rotatable about the vertical axis of the body from a position permitting the flow of content material through the hollow body and out through the discharge spout to another position cutting off the flow of content material through the body, a ring member concentrically positioned in the discharge opening of the container and having a downwardly converging circular wall terminating immediately above the inclined member, and means for preventing the hollowing out of the content material within the container as it is progressively dispensed therefrom comprising an elongated double cone member within the container and shaped in the form of two cones secured together at their large ends with their small ends disposed adjacent opposite ends of the container, and means suspending the double cone shaped member within the container from one apex end so that the other apex end thereof projects downwardly centrally through the opposite discharge opening of the container and into the area defined by the converging circular wall of the ring member.

2. In a dispensing device for coffee and like material including a vertically arranged container having a discharge opening in the lower end thereof through which the content material of the container flows out, a hollow body secured to the lower end of the container in surrounding relation to the discharge opening thereof for receiving the content material from the container, said hollow body terminating at its lower end in a discharge spout, valve means in the interior of the hollow body for controlling the flow of content material therethrough and out of the spout and comprising a horizontally disposed disc rotatable about the vertical axis of the hollow member, and a vane suspended from the underside of the valve disc and projecting downwardly into the spout, said vane extending substantially diametrically across the valve disc and dividing the disc into two substantially semi-circular portions, one of said semi-circular portions being imperforate and the other having an aperture therethrough, and means cooperating with the valve disc and operable upon rotation of the disc to control the flow of material from the container to the discharge spout, said vane being jointly rotatable with the valve disc and functioning as a guide in the spout to pass the material directly therethrough.

3. In a dispensing device for coffee and like material including a vertically arranged container having a discharge opening in the lower end thereof through which the content material of the container flows out, a hollow body secured to the lower end of the container in surrounding relation to the discharge opening thereof for receiving the content material from the container, said hollow body terminating at its lower end in a discharge spout, valve means in the interior of the hollow body for controlling the flow of content material therethrough and out of the spout and comprising a horizontally disposed disc rotatable about the vertical axis of the hollow member, and means carried on the underside of the valve disc and projecting into the spout for guiding the material in a freely flowing stream through the spout, said means comprising a valve structure of T-shaped cross-section fixed to the underside of the valve disc and projecting downwardly into the spout in juxtaposition to the interior wall surfaces thereof, said valve disc provided with a vertical passage therethrough having an area slightly less than half of the disc and located in that segmental portion of the disc on one side of the cross of the T and traversed by the leg of the T.

LOUIS O. HUHN.

References Cited in the file of this patent

UNITED STATES PATENTS

| Number | Name | Date |
|---|---|---|
| 1,026,507 | Hays et al. | May 14, 1912 |
| 2,243,335 | Elliott | May 27, 1941 |
| 2,584,781 | Beatty | Feb. 5, 1952 |

FOREIGN PATENTS

| Number | Country | Date |
|---|---|---|
| 2,099 | Great Britain | Jan. 27, 1911 |
| 258,977 | Italy | June 11, 1928 |